Dec. 29, 1964    F. KUGEL    3,163,269
TORQUE CONVERTER WITH SYMMETRICAL BLADING, MECHANICAL
CLUTCH, AND MEANS TO FILL AND PARTIALLY EMPTY
THE WORKING CHAMBER
Filed Aug. 15, 1960    2 Sheets-Sheet 1

United States Patent Office 3,163,269
Patented Dec. 29, 1964

3,163,269
TORQUE CONVERTER WITH SYMMETRICAL BLADING, MECHANICAL CLUTCH, AND MEANS TO FILL AND PARTIALLY EMPTY THE WORKING CHAMBER
Fritz Kugel, Heidenheim (Brenz), Germany, assignor to J. M. Voith G.m.b.H., Heidenheim (Brenz), Germany
Filed Aug. 15, 1960, Ser. No. 49,753
Claims priority, application Germany Aug. 29, 1959
9 Claims. (Cl. 192—3.2)

The present invention relates to a torque converter arrangement and, more specifically, to a torque converter adapted to be shunted.

It is known to shunt a torque converter according to the fluid flow principle, in such a way that the primary part and secondary part of the converter will be rigidly connected to each other through the intervention of a mechanical clutch. With such a system, it is possible in operational ranges in which the torque conversion of the converter is not required, to switch off the converter and to carry out the power transmission in a purely mechanical manner.

In shunted condition of the converter, however, a braking effect will occur in view of the rotating primary part and secondary part on one hand and the stationary guide wheel on the other hand. In an effort to reduce or avoid this braking effect which destroys a portion of the driving power and thereby reduces the degree of efficiency of the installation, various methods and devices have been suggested. As the simplest way it was suggested to empty the converter. The emptying of the converter, however, requires a relatively long time and, therefore, is not always suitable. Another possibility to avoid the braking effect of the shunted converter consists in arranging the guide wheel rotatably and holding the guide wheel stationary for the ordinary operation either by a brake or by a free wheel system, whereas the guide wheel will be released for the shunting operation. Such an arrangement, however, is relatively expensive as to manufacture, particularly when the guide wheel blades are designed adjustable for torque conversion of the converter.

It is furthermore possible to avoid the said braking effect by moving the guide wheel blading out of the circuit of the converter when the latter is shunted. However, also in this instance the construction becomes relatively very expensive.

It is, therefore, an object of the present invention to provide an arrangement for avoiding the braking effect with a shunted converter within a minimum time after shunting the converter and without materially increasing the construction of the installation.

It is another object of this invention to provide an arrangement as set forth in the preceding paragraph which will materially facilitate the control of the filling or emptying of the converter.

These and other objects and advantages of the invention will appear more clearly from the following specification in connection with the accompanying drawings, in which.

*General Arrangement*

Figure 1:
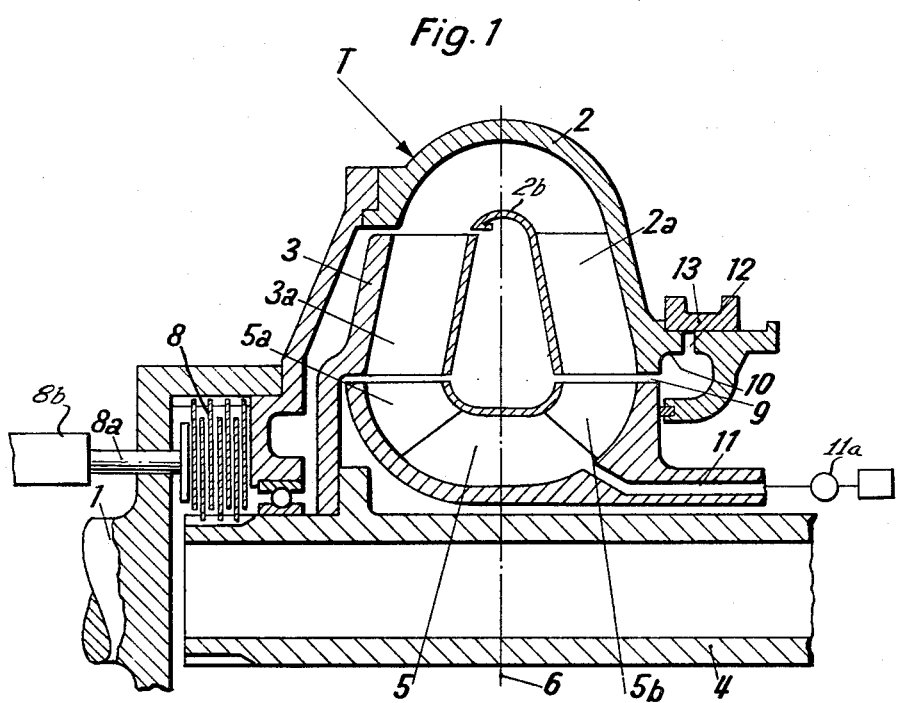
FIG. 1 illustrates a longitudinal section through a converter shunting system according to the invention.

The above objects have been realized according to the present invention by arranging the blading of the primary part and of the secondary part radially outwardly of the blading of the guide wheel while providing a device for selectively emptying the working chamber of the converter at least up to the outer diameter of the guide wheel blading and for refilling said working chamber. Such a device may for instance be so designed that the supply of converter fluid will be controlled as to quantity and that the liquid will flow off through bores at the outer circumference of the primary part or of the secondary part. When the torque converter is in operation, the supply of liquid is so great that in spite of the flowing off of the liquid through the bores and at leakage points, the converter will remain completely filled. When, however, shunting the converter, the supply of liquid will be limited to such an extent that only the primary and secondary parts will be filled which means that the liquid will no longer contact the guide wheel blading. This partial emptying of the converter will be effected in a relatively short time.

Advantageously, the blading of the primary part and of the secondary part will be designed substantially symmetrically to a plane perpendicular to the axis of rotation of the converter. In this way, the liquid rings in the partly empty converter will on both sides of said plane be substantially of the same magnitude and will, due to the centrifugal force, act in said plane against each other with the same force thereby preventing a meridian flow in the circuit of the converter which would occur with a non-symmetric arrangement of the above mentioned converter parts while simultaneously producing a braking effect.

When with the arrangement according to the invention the primary and secondary parts of the converter are coupled to each other, in other words when the converter is bridged or shunted, and when air only is present in the interior of the guide wheel blading, no liquid circulation and thus no power transmission will take place between the primary part and secondary part on one hand and the guide wheel on the other hand. In this way, no braking effect will occur between the stationary and the rotating parts of the converter. The friction between the liquid ring in the rotating part of the converter on one hand and the air in the guide wheel blading on the other hand is negligibly low and is of no practical importance at all.

According to a further development of the invention, the converter is so designed that it may be emptied through the annular gap between the guide wheel on one hand and the primary and secondary parts on the other hand. This possibility has the advantage that the emptying of the converter need not be interrupted at the time when liquid is present in the primary and secondary parts only. The emptying rather stops by itself at said point if it is effected through said gap.

A further feature of the arrangement according to the present invention consists in that the primary part is located on that side which is remote from the drive, whereas the secondary part is located on that side which faces the drive, and that furthermore the gap on the primary side will be employed for partial emptying of the converter. This arrangement brings about structural advantages and makes possible a better discharge of the oil which passes through said gap.

According to a further modification of the invention, outside the gap on the primary part and on the secondary part there is provided an annular collecting trough for the liquid, said collecting trough being provided with one or more discharge openings. When the primary and secondary parts rotate, the liquids will be drawn through the gap into said collecting trough and will thus be able through the discharge openings to pass into the sump.

According to a further modification of the oil discharge from the converter, an annular collecting trough without discharge openings is arranged outside the gap at the primary and secondary parts. A scoop pipe engages the said collecting trough and has its entrance opening located substantially on the diameter of said gap. The scoop pipe picks up the liquid at the collecting trough and conveys said liquid to the sump. In this way, even with the filling supply choked, the desired partial emptying will be effected.

With the heretofore known arrangements for selectively partially emptying the converter, it is necessary that when operating the torque converter, the liquid supply compensate the flowing off of the liquid through bores or the gap and also the leakage losses. As a result thereof, it is necessary under all circumstances to pass through the converter such great quantities of liquid that they far exceed the quantities required for the cooling. This not necessary excessive supply may be reduced by closing the discharge opening entirely or partially when operating the converter. Therefore, according to the present invention the discharge openings or the scoop pipe are provided with one or more controllable shut-off valves.

Any controllable shut-off valve adapted to shut off an oil flow may be used in this connection. The so-called quick emptying valve has proved particularly advantageous. This last mentioned valve consists primarily of a differential piston in the form of a flexible diaphragm or a metallic bellows the outer surfaces of which are acted upon by the filling pressure and exceed the inner actuating surface which latter is subjected to the pressure of the converter. The filling pressure of the converter is taken advantage of for closing the valve in such a way that the closing force from the outside exceeds the force which the converter pressure produces from the inside. As long as filling pressure is present, the quick emptying valve will be closed. If, however, there prevails no longer any filling pressure, the quick emptying valve opens, and the partial emptying of the torque converter will take place. It is, of course, possible to actuate the filling pressure and shunting clutch together in corresponding manner.

According to another embodiment of the shut-off valve, a control piston is provided which is operable mechanically, hydraulically or pneumatically in a manner known per se. This control piston may be controlled preferably against a spring pressure and/or the filling pressure of the converter by having the filling pressure at ordinary operation act not only upon the converter but also close the shut-off valve.

A particularly simple construction of the shut-off valve may consist in a displaceable ring for common control of the discharge openings.

Structural Arrangement

Referring now to the drawings in detail and FIG. 1 thereof in particular, it may be assumed that the primary shaft 1 of a torque converter generally designated T be driven so that the primary wheel 2 with the primary blading 2a will be driven. The torque will then be conveyed through the intervention of the secondary blading 3a to the secondary wheel 3 and the secondary shaft 4. The guide wheel 5 with the blading 5a, 5b is stationarily arranged. The blading of the primary and secondary parts is substantially symmetrical to the plane 6 which latter is substantially perpendicular to the axis of rotation of the converter parts. The primary blading 2a and the secondary blading 3a are arranged outside the outer diameter of the guide wheel blading 5a, 5b. A member 2b extends from the ends of blades 2a and defines the inner surface of the working fluid path.

Figure 2:
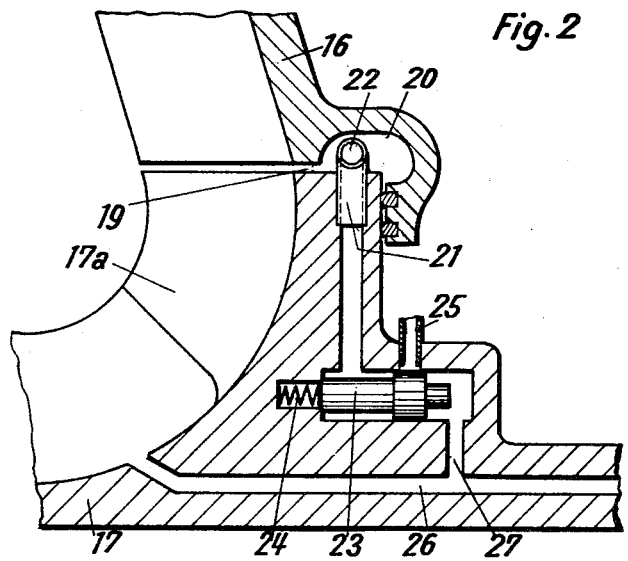
FIG. 2 is a partial section through a first modified arrangement according to the invention on a larger scale than that of FIG. 1.

An actuating member 8a operable by an actuator diagrammatically indicated at 8b and which may be hydraulic, electric or mechanical in nature, is adapted to press the discs of a friction clutch 8 together thereby shunting the primary and secondary parts of the converter so that the drive is conveyed from the primary shaft 1 directly without slip to the secondary shaft 4. At the outer diameter of the guide wheel blade ring 5b on the side of the primary blading 2a there is provided an annular gap 9 through which liquid passes into a collecting passage 10 rotating together with the primary wheel 2. A discharge opening 12 may, by displacing a ring 13, be closed or opened depending on whether the torque converter is to be operative or is to be shunted. In opened condition of discharge opening 12, the rotating converter will be emptied to such an extent that liquid will remain only in the coupled primary and secondary parts. The converter is adapted to be filled through a supply conduit 11. A source of fluid, such as pump 11a, may be connected to conduit 11 for selectively supplying fluid to the converter. FIG. 2 illustrates a portion of the primary wheel 16 and portion of the guide wheel 17. At the level of the outside diameter of the guide wheel ring 17a there is provided a gap 19 through which, when the converter is rotating, the liquid passes into a collecting channel 20. A scoop pipe 21 extends into collecting channel 20. Due to the fact that the liquid moves in the rotating collecting channel relative to the stationary scoop pipe, the liquid will pass through the entrance opening 22 of scoop pipe 21 to a control piston 23. This control piston will be actuated by the filling pressure of the converter to such an extent that the control piston 23 will at normal torque converter operation be displaced toward the left by the filling pressure and will prevent a partial emptying. When the converter is shunted, the filling pressure will be taken away so that the piston will be displaced toward the right by a spring 24 whereby a partial emptying through the scoop pipe and a discharge conduit 25 will be effected. The converter will be filled through a conduit 26 from which a branch conduit 27 leads to control piston 23.

Figure 3:
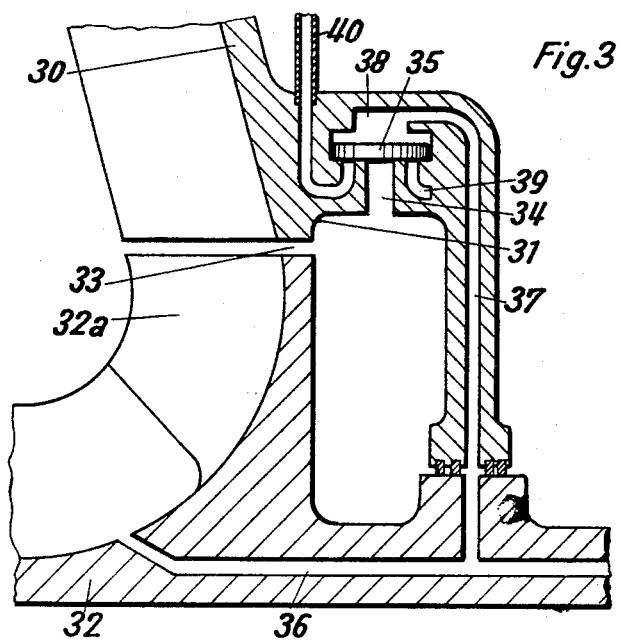
FIG. 3 is a partial section through a further modified arrangement of the present invention on a larger scale than that of FIG. 1.

FIG. 3 representing a further modification, shows a portion of the primary wheel 30 with an oil collecting passage 31, and further shows a portion of a guide wheel 32. At about the outer diameter of the guide wheel blade ring 32a adjacent the passage 31 there is provided a discharge opening 34 adapted to be closed by a diaphragm 35 of a quick emptying valve. This diaphragm is controlled by the filling pressure of the converter. The converter is filled through a conduit 36 and is held under a certain over-pressure in order to assure the filling, i.e. the compensation for leakage losses. At the same time also a branch conduit 37 is under the said pressure and causes the diaphragm 35 to be pressed against the discharge opening 34 thereby closing the shut-off valve so that no liquid can escape. The diameter of the discharge opening 34 is less than the diameter of a chamber 38 in which the diaphragm is guided so that the pressure (closing pressure) exceeds the opening pressure. When the converter is shunted, the filling pressure is taken away. The conduits 36 and 37 will thus be without pressure. The liquid which is thrown out of gap 33 and passes through collecting channel 31 into the discharge opening 34 lifts off the diaphragm 35 and thereby opens the discharge valve. The liquid may now through an annular passage 39 and a conduit 40 flow off until the partial emptying has been obtained.

It is, of course, to be understood that the present invention is, by no means, limited to the particular constructions shown in the drawings but also comprises any modifications within the scope of the appended claims.

What I claim is:

1. In combination: a fluid torque converter having a bladed primary part for driving connection with a power input shaft, a bladed secondary part, and a bladed guide wheel; said primary and secondary parts and said guide wheel confining with each other the working chamber of said converter; the radially inner edges of the blades of the primary and secondary parts and the radially outer edges of the blades of said guide wheel part extending axially of the converter, said primary and secondary parts on one hand and said guide wheel on the other hand being spaced radially and thereby confining annularly extending gap means with each other; annular channel means carried by one of said parts outside said gap means and communicating therewith, discharge conduit means communicating with said channel means; an output shaft drivingly connected to said secondary part; mechanical clutch means interposed between said primary part and said output shaft and operable selectively to establish and to interrupt mechanical driving connection between said primary part and said output shaft; the entire blading of said primary and secondary parts being located radially outside the entire blading of said guide wheel; means for selectively filling said working chamber when said clutch is disengaged and there is relative rotation between said primary part and said secondary part, and means for controlling said discharge conduit means for emptying said working chamber up to the outer diameter of the blading of said guide wheel when said clutch is engaged and the primary part and secondary part are locked together.

2. In combination: a fluid torque converter having a bladed primary part for driving connection with a power input shaft, a bladed secondary part, and a bladed guide wheel; said primary and secondary parts and said guide wheel confining with each other the working chamber of said converter; said primary and secondary parts on one hand and said guide wheel on the other hand being spaced radially and thereby confining annularly extending gap means with each other; means forming annular channel means carried by one of said parts outside said gap means and communicating therewith; discharge conduit means communicating with said channel means; an output shaft drivingly connected to said secondary part; mechanical clutch means interposed between said primary part and said output shaft and operable selectively to establish and to interrupt mechanical driving connection between said primary part and said output shaft; the entire blading of said primary and secondary parts being located radially outside the blading of said guide wheel; means for selectively filling said working chamber when said clutch is disengaged and there is relative rotation between said primary part and said secondary part; and at least one controllable shutoff valve associated with said discharge conduit means for controlling the flow of fluid therethrough for emptying said working chamber up to the outer diameter of the blading of said guide wheel when said clutch is engaged and the primary part and secondary part are locked together.

3. An arrangement according to claim 2, in which said controllable valve means comprises a differential piston having one surface communicating with the interior of said working chamber and responsive to fluid pressure for urging the valve in opening direction and having another surface exposed to the filling pressure of the converter and responsive to fluid pressure for urging the valve in closing direction, said last-mentioned surface being greater than said first-mentioned surface.

4. An arrangement according to claim 2, in which said controllable valve means comprises a valve disc having a smaller area exposed to pressure in the working chamber for urging it toward open position and a larger area exposed to the filling pressure of the converter for urging it toward closed position.

5. An arrangement according to claim 2, in which said discharge conduit means terminates in a radially outwardly opening port means and the controllable valve means comprises an annular slide member operable for controlling said port means.

6. In combination: a fluid torque converter having a bladed primary part for driving connection with a power input shaft, a bladed secondary part, and a bladed guide wheel; said primary and secondary parts and said guide wheel confining with each other the working chamber of said converter; said primary and secondary parts on one hand and said guide wheel on the other hand being spaced radially and thereby confining annularly extending gap means with each other; means forming annular channel means carried by one of said parts outside said gap means and communicating therewith; scoop means extending into said channel means and having its entrance opening arranged at least approximately at the diameter of said gap means; an output shaft drivingly connected to said secondary part; mechanical clutch means interposed between said primary part and said output shaft and operable selectively to establish and to interrupt mechanical driving connection between said primary part and said output shaft; the entire blading of said primary and secondary parts being located radially outside the blading of said guide wheel; means for selectively filling said working chamber when said clutch is disengaged and there is relative rotation between said primary part and said secondary part, or emptying the same at least up to the outer diameter of the blading of said guide wheel; and at least one controllable shutoff means associated with said scoop means for controlling the flow of fluid therethrough for emptying said working chamber up to the outer diameter of the blading of said guide wheel when said clutch is engaged and the primary part and secondary part are locked together.

7. In combination: a fluid torque converter having a bladed primary part for driving connection with a power input shaft; a bladed secondary part, and a bladed guide wheel; said primary and secondary part, and said guide wheel confining with each other the working chamber of said converter; said bladed primary part and said bladed secondary part being symmetrical with regard to a plane forming the central plane through said working chamber and perpendicular to the axis of rotation of said converter; an output shaft drivingly connected to said secondary part; mechanical clutch means interposed between said primary part and said output shaft and operable selectively to establish an interrupt mechanical driving connection between said primary part and said output shaft; said guide wheel on one hand and said primary and secondary parts on the other hand being spaced radially and thereby confining with each other annular gap means; and means for selectively filling said working chamber when said clutch is disengaged and when there is relative rotation between said primary part and said secondary part, and other means for emptying said working chamber through said gap means up to said outer diameter of the blading of said guide wheel when said clutch is engaged and said primary part and said secondary part are thereby locked together.

8. The combination according to claim 7 wherein the radially inner edges of the blading of said primary and secondary parts and the radially outer edges of the blading of said guide wheel are parallel to each other and to the axis of rotation of the converter.

9. In combination: a fluid torque converter having a bladed primary part for driving connection with a power input shaft; a bladed secondary part, and a bladed guide wheel; said primary and secondary part, and said guide wheel confining with each other the working chamber of said converter; said bladed primary part and said bladed secondary part being symmetrical with regard to a plane forming the central plane through said working chamber and perpendicular to the axis of rotation of said converter; an output shaft drivingly connected to said secondary part; said guide wheel on one hand and said primary and secondary parts on the other hand being spaced radially and thereby confining with each other annular gap means; and means for selectively filling said working chamber when there is relative rotation between said primary part and said secondary part, and other means for emptying said working chamber through said gap means up to said outer diameter of the blading of said guide wheel when said primary part and said secondary part are locked together, and means for locking said primary and secondary parts together.

(References on following page)

References Cited in the file of this patent

UNITED STATES PATENTS

| | | |
|---|---|---|
| 1,987,985 | Bauer et al. | Jan. 15, 1935 |
| 2,024,842 | Bauer et al. | Dec. 11, 1935 |
| 2,074,346 | Sinclair | Mar. 23, 1937 |
| 2,397,862 | Jencick | Apr. 2, 1946 |
| 2,679,728 | Trail | June 1, 1954 |
| 2,717,673 | Zeidler | Sept. 13, 1955 |
| 2,886,981 | Forster | May 19, 1959 |
| 2,894,609 | Tattersall | July 14, 1959 |
| 2,965,202 | Christenson | Dec. 20, 1960 |